United States Patent [19]
Bailey et al.

[11] 3,859,323
[45] Jan. 7, 1975

[54] PREPARATION OF 4,4'-METHYLENEBIS (CYCLOHEXYLISOCYANATE)

[75] Inventors: Maurice E. Bailey, Orchard Park; Richard G. Spaunburgh, Elma; Raymond B. Davison, Fairport, all of N.Y.

[73] Assignee: Allied Chemical Corporation, New York, N.Y.

[22] Filed: Apr. 2, 1969

[21] Appl. No.: 812,870

[52] U.S. Cl. ..................... 260/453 PH, 260/453 A
[51] Int. Cl. .......................................... C07c 119/04
[58] Field of Search .................. 260/453 PH, 453 A

[56] References Cited
UNITED STATES PATENTS
3,311,654   3/1967   Saviah et al. ..................... 260/453

Primary Examiner—Lewis Gotts
Assistant Examiner—Dolph H. Torrence
Attorney, Agent, or Firm—Anthony J. Stewart; Jay P. Friedenson

[57] ABSTRACT

A method for preparing 4,4'-methylenebis(cyclohexylisocyanate) from polycycloaliphatic amine residues or acid salts thereof by reaction with phosgene to form a carbamoyl chloride isocyanate reaction product and pyrolyzing said reaction product to obtain 4,4'-methylenebis (cyclohexylisocyanate) therefrom.

8 Claims, No Drawings

PREPARATION OF 4,4'-METHYLENBIS (CYCLOHEXYLISOCYANATE)

This invention relates to the preparation of 4,4'-methylenebis(cyclohexylisocyanate) from polycycloaliphatic amine residues containing both primary and secondary amine groups. The product, 4,4'-methylenebis(cyclohexylisocyanate), is useful in the preparation of polyurethane resins.

4,4'-methylenebis(cyclohexylisocyanate) ($H_{12}MDI$) is usually prepared by a method which involves the phosgenation of the corresponding diamine, 4,4'-methylenebis(cyclohexylamine) ($H_{12}MDA$) or an acid salt thereof. The diamine is conventionally prepared by the catalytic hydrogenation of methylenebis(phenylamine), for example, as described in U.S. Pat. No. 2,606,925 or as disclosed in co-pending application Ser. No. 812,884 filed of even date herewith to R. J. Duggan and E. G. Thomas entitled "Process for the Production of 4,4'-methylenebis(cyclohexylamine)". The hydrogenation process, which involves conversion of the aromatic group of the diamine to a cycloaliphatic group, results in a crude product which contains the desired diamine as well as a substantial amount of undesired impurities consisting essentially of generally from about 1 to 60 percent and in some cases as much as 95 percent by weight of secondary amino polyamines of the general formula:

(I) 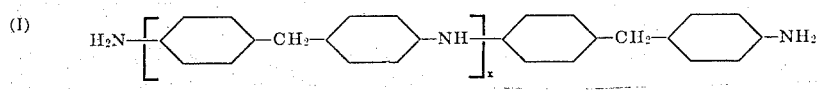

wherein $x$ is an integer of from 1 to 3.

In the preparation of 4,4'-methylenebis(cyclohexylisocyanate) from the corresponding amine, it has heretofore been considered necessary to first purify the amine, for example by distillation, to remove and discard the aforementioned undesired secondary amino polyamine impurities. The loss of these secondary amino impurities or residues normally produced during the preparation of the diamine, which may constitute a substantial portion of the crude 4,4'-methylene bis(-cyclohexylamine), while representing an obvious economic and process disadvantage has nevertheless been tolerated since it has been the belief in the art that high purity of the amine reactant is a necessary factor for the preparation of isocyanates of good yield and purity. During the preparation of isocyanates by phosgenation of the corresponding amine, a number of competing and troublesome side reactions are possible such as the formation of substituted ureas and polyureas, and it was believed that the use of pure amine reactants, either minimized these competing reactions or, in the least, did not further add to such reactions.

It is known to produce isocyanates from the phosgenation of primary amines which are often expensive and difficult to obtain in the necessary state of purity. It is also known to prepare secondary carbamoyl chlorides by reacting phosgene with certain secondary amines. However, many of those secondary carbamoyl chlorides which have been thus prepared often decompose upon distillation with loss of carbonyl chloride and formation of polyureas and it has been necessary that the secondary amines contain a tertiary alkyl directly attached to the nitrogen, the tertiary alkyl serving to direct the position of cleavage and location of the resulting isocyanate group. In addition to requiring the use of pure amine reactants, the results of the procedure vary widely depending on the particular secondary amine employed, best results being obtained when either a tertiary amine or Lewis acid catalyst is employed. The disadvantages of having to first prepare a tertiary alkyl containing amine of satisfactory purity and to additionally employ catalysts are obvious.

The present invention provides a process whereby the aforementioned secondary amino polyamine residues are converted to 4,4'-methylenebis(cyclohexylisocyanate). More specifically, the present invention provides a process for the preparation of $H_{12}MDI$ by phosgenation of crude $H_{12}MDA$.

Broadly, the present process comprises (A) reacting phosgene with secondary amine polyamine residues of the general formula:

(I) 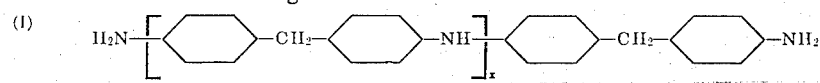

wherein $x$ is an integer of from 1 to 3 or acid salts thereof to convert said amine residues to carbamoyl chloride isocyanates of the general formula:

(II) 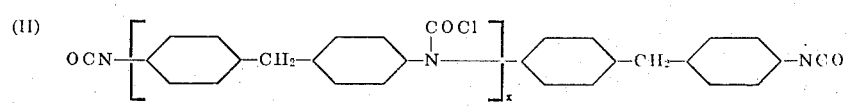

wherein $x$ is as above defined;
(B) pyrolyzing said carbamoyl chloride isocyanates and recovering 4,4'-methylenebis(cyclohexylisocyanate) therefrom.

The process of the invention may be applied to the residue left from the purification of crude $H_{12}MDA$ or directly to the crude $H_{12}MDA$ containing substantial amounts of the secondary amino polyamine impurities. The reactant is preferably crude $H_{12}MDA$ containing at least 5 percent by weight and especially about 10 to 60 percent by weight of the secondary amino polyamine impurities.

Thus, according to a preferred embodiment of the process of the present invention, the crude diamine mixture, crude 4,4'-methylenebis(cyclohexylamine) which contains substantial amounts of secondary amino polyamine impurities is first phosgenated to convert the primary amine groups to isocyanate groups and the secondary amine groups to carbamoyl chlorides. At this point, 4,4'-methylenebis(cyclohexylamine) present in the crude mixture is converted to 4,4'-methylenebis(cyclohexylisocyanate) and the secondary amino polyamines (Formula I) are converted to carbamoyl chloride isocyanates (Formula II). The reaction mixture is then heated to elevated temperatures under reduced pressure. Thus, the initially formed isocyanate is distilled from the reaction mixture while the remaining reaction mass is pyrolyzed resulting in cleavage at the secondary nitrogen bond and conversion of the secondary carbamoyl chloride to a terminal isocyanate thereby forming additional isocyanate and olefinic material. (The latter consists primarily of 3-cyclohexenyl-4'-isocyanato cyclohexylmethane.) As the pyrolysis products are formed they are removed by distillation, HCl coming off as a non-condensible gas. The olefinic material may be separated from the 4,4'-methylenebis(cyclohexylisocyanate) by subsequent fractional distillation.

When applied to the residue left from the purification of crude 4,4'-methylenebis(cyclohexylamine), the procedure is essentially the same as described above except that no 4,4'-methylenebis(cyclohexylisocyanate) distills from the reaction mixture prior to pyrolysis.

In the practice of the present invention, it is preferred to react the amine starting materials with $CO_2$ or a mineral acid such as HCl, HBr, etc. by methods generally known in the art to form the corresponding amine acid salt prior to phosgenation. Preferably, the acid salts are prepared by reacting the amine with mineral acid such as HCl until the reaction product is acid to an indicator such as Congo Red. In general, it has been found that the phosgenation of the amine acid salt proceeds more efficiently and with higher yields than direct phosgenation of the free amine. The phosgenation, as well as the preceding amine acid salt preparation are preferably carried out in a liquid reaction medium utilizing an inert solvent such as toluene, monochloro benzene, dichlorobenzene or the like.

In general, one molecule of phosgene is required for the conversion of each secondary and primary amino group. It is preferred to employ an amount of phosgene that is in excess of the stoichiometric requirements, for example, at least about 5% excess, to ensure a maximum rate of formation of 4,4'-methylenebis(isocyanate).

The temperature and pressure conditions prior to the pyrolysis step, that is during the formation of the acid salt and subsequent phosgenation, may vary considerably. Normally, these steps are carried out at atmospheric or superatmospheric pressures. The phosgenation is carried out at elevated temperatures such as between 100° and 200° C. and preferably between 145° and 170° C. Following the phosgenation step, the solvent may be removed by conventional means such as distillation.

The pyrolysis step is effected by heating the phosgenation product, preferably under reduced pressure. According to a preferred embodiment, the pyrolysis step is carried out at pressures less than about 30, preferably between about 0.2 and 20 millimeters of mercury and especially between about 0.3 and 1.4 millimeters of mercury and temperatures between about 170° and 280°, preferably between 200° and 250° C. Under these conditions, the pyrolytic product is removed by distillation as it forms as a result of the reduced pressures and decomposition of the desired 4,4'-methylenebis(cyclohexylisocyanate) which results from higher temperatures is avoided. Pyrolysis of the product is visually indicated by the evolution of HCl form the phosgenation product and completion of the reaction is generally indicated by a distinct decline in the vapor temperature which usually ranges from about 125° to about 175° C. during the pyrolysis step.

The product of the pyrolysis step, a mixture of 4,4'-methylenebis(cyclohexylisocyanate) and olefinic material, namely 3-cyclohexeny -4'-isocyanatocyclohexylmethane may be further purified, if desired, and 4,4'-methylenebis(cyclohexylisocyanate) recovered therefrom by a subsequent distillation. Such a distillation is preferably carried out at pressures below about 30 millimeters mercury and temperatures below about 280°C. in order to avoid decomposition of the isocyanate. The novel process of the invention may be further understood by the following specific examples which further illustrate the invention and the manner in which it may be practiced. In the examples, unless otherwise indicated, all parts are by weight and all temperatures are in Centigrade degrees.

EXAMPLE 1

Part A

Crude 4,4'-methylenebis(cyclohexylamine) was obtained according to the process of the aforementioned co-pending application of Duggan et al. by subjecting a reaction mixture of 800 parts of 4,4'-methylenebis(phenylamine), 11.4 parts of a 5 percent by weight rhodium on alumina catalyst to a pressure of 150 pounds per square inch (gauge) and maintaining the temperature at 130°C. for 12 hours while hydrogen gas was passed through the pressurized reaction mixture at a rate of 6 cubic feet per hour. The composition of the crude reaction product after removal of the catalyst by filtration was as follows:

| Component | Percent by Weight |
| --- | --- |
| $H_{12}MDA$ | 76 |
| 4-aminodicyclohexylmethane | 1.8 |
| Other impurities | 0.8 |
| Residue (as shown in Formula (I) above) | 21.4 |

Part B

A 150 part portion of the crude $H_{12}MDA$, prepared in accordance with Part A, was mixed with 1,350 parts of dichlorobenzene. The mixture was reacted with anhydrous HCl at 20°–30° until the reaction product was acid to Congo Red indicator. The reaction mixture was heated to and maintained at 150° and phosgene was bubbled in at a rate of 1.58 parts per minute for a period of 3 hours and 50 minutes. The reaction mixture was then purged with nitrogen and the dichlorobenzene was removed by distillation. The remainder was a crude mixture of $H_{12}MDI$ and phosgenated residues of the type depicted in formula (II) hereinabove. This crude mixture was heated, under reduced pressure, to distill $H_{12}MDI$ and to pyrolyze and distill and pyrolysis products. During the pyrolysis and distillation, pressure was maintained between 0.3 and 1.35 millimeters of mercury. When the reaction mixture reached a temperature of about 200°, the evolution of HCl indicated pyrolysis. The final temperature of the reaction mixture was 275°. Vapor temperature during the pyrolysis and distillation ranged from 150° to 173.5° and then began to fall indicating completion of the reaction. The residue of undistilled material remaining was 12 parts. The total distillate was 175 parts including about 19 parts of olefinic materials, mainly 3-cyclohexenyl-4'-isocyanatocyclohexyl methane. By Gas-liquid chromatographic analysis, the yield of $H_{12}MDI$ was found to be 155.5 parts corresponding to 109.1 percent of theory based on the amount of $H_{12}MDA$ present in the crude starting material.

The fact that $H_{12}MDI$ was produced in an amount considerably in excess of the amount which could be prepared from the $H_{12}$MDA present clearly indicates that a substantial portion of the residue (I) in the starting material was converted to $H_{12}$MDI.

A typical conversion of $H_{12}$MDI, starting with purified $H_{12}$MDA results in a yield of about 95 percent of theory as illustrated by the following comparative example.

EXAMPLE 2

A portion of crude $H_{12}$MDA prepared by the procedure of Part A of Example 1 was purified by distillation and 210 parts of the purified $H_{12}$MDA was mixed with 1,890 parts of dichlorobenzene. The mixture was acidified with anhydrous HCl at 20°–30° until acid to Congo Red indicator. The mixture was then heated to 150° and maintained thereat for 3½ hours while phosgene was bubbled in at 2.5 parts per minute. The resultant $H_{12}$MDI was purged with nitrogen and the dichlorobenzene was removed by distillation at a pressure of 8 millimeters of mercury and up to a pot temperature of 175°. The product was then purified by further distillation at pressures between 0.68 to 0.90 millimeters of mercury. The final pot temperature was 210°. The residue of undistilled material remaining in the pot was 8 parts. The yield of $H_{12}$MDI was 248.9 parts or 95.1 percent of theory.

EXAMPLE 3

The $H_{12}$MDA employed in this example was a crude grade prepared in a manner similar to that described in Example 1 and having the following composition, in percent by weight:

| | | |
|---|---|---|
| $H_{12}$MDA | 86.4 | percent |
| Residue (as shown in Formula (I) above) | 12.0 | percent |
| 4-aminodicyclohexyl-amine | 1.3 | percent |
| Other impurities | 0.3 | percent |

150 parts of the above crude material was mixed with 1,350 parts of dichlorobenzene. The mixture was reacted with anhydrous HCl at 20°–30° until the reaction product was acid to Congo Red indicator. Phosgene was bubbled into the reaction mixture at an average rate of 1.65 parts per minute over a period of 3¾ hours while the temperature was maintained at between 145° and 170°. The reaction mixture was purged with nitrogen and dichlorobenzene was removed by distillation. The remaining crude mixture of $H_{12}$MDI and phosgenated residues containing carbamoylchlorides (Formula II) was heated under reduced pressure to pyrolyze and distill. Pressure was maintained at between 0.35 and 0.60 millimeters of mercury while the reaction mixture was heated to a final temperature of 213°. Vapor temperature ranged from 154.5 to 159°. A yield of 162.3 parts of $H_{12}$MDI, or 101.3 percent of theory based on the $H_{12}$MDA in the crude starting material, was obtained.

EXAMPLE 4

A 150 part portion of crude $H_{12}$MDA having the following analysis in percent by weight:

| | | |
|---|---|---|
| $H_{12}$MDA | 52.9 | percent |
| Residue (as shown in Formula (I) above) | 45.3 | percent |
| 4-aminodicyclohexylamine | 1.3 | percent |
| Other impurities | 0.5 | percent | was mixed with 1,350 parts of dichlorobenzene and reacted with HCl, phosgenated, pyrolyzed and distilled following the procedure of Example 1, except as otherwise noted. A phosgene feed rate of 1.79 parts per minute over a period of 3 hours and 10 minutes was employed. During the distillation about 25 parts of low boiling material was removed at vapor temperature ranging from 31° to 166° and pressures of between 0.25 and 0.65 millimeters of mercury. The bulk of the distillate (139 parts) was removed at vapor temperatures between 166° and 171° and pressures of between 0.65 and 0.95 millimeters of mercury. The final temperature of the reaction mixture (pot temperature) was 280°. The residue amounted to 27 parts. Gas-liquid chromatographic analysis of the distillate indicated a total yield of 124.7 parts of $H_{12}$MDI or 126 percent of theory based on $H_{12}$MDA present in the crude starting material.

EXAMPLE 5

A quantity of crude $H_{12}$MDA was prepared by catalytic hydrogenation in a manner similar to that described in Example 1. The crude reaction product was distilled to separate the $H_{12}$MDA. The residue contained no detectable $H_{12}$MDA and consisted primarily of secondary amino polyamines illustrated by Formula I above. An 81 part portion of this residue was mixed with 675 parts of dichlorobenzene and was reacted at room temperature with anhydrous HCl until the mixture was acid to Congo Red. Next phosgene was bubbled into the reaction mixture at a rate of 0.905 parts of phosgene per minute while the temperature was increased to 155° over a period of 1 hour. The phosgene feed was contained for an additional 4 hours while the temperature was maintained at 150° to 155°. The phosgene feed was then stopped and the reaction mixture was purged with nitrogen at 150°–160° for about 1 hour. The dichlorobenzene was removed by distillation at 67° to 74° and a pressure of 21 millimeters of mercury. The remaining reaction product, which consisted primarily of phosgenated residues of the type shown in Formula II, was pyrolyzed and distilled at a pressure of 0.60 to 0.95 millimeters of mercury. Pyrolysis began at a temperature of about 190° and was substantially complete at a temperature of about 245°. During the distillation, the temperature of the condensing vapors rose from 129° to 168° and then declined indicating completion of the pyrolysis. A yield of 24 parts of $H_{12}$MDI was obtained.

It will be apparent to those skilled in the art that many variations and modifications of the invention as hereinabove set forth may be made without departing from the spirit and scope of the invention. The invention is not limited to those details and applications described, except as set forth in the appended claims.

We claim:

1. A process for the preparation of 4,4'-methylenebis(cyclohexylisocyanate) which comprises
   A. reacting a secondary amine polyamine residue resulting from the purification of 4,4'-methylenebis (cyclohexylamine), which residue has the formula:

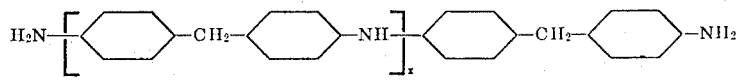

wherein x is an integer of from 1 to 3, or a mineral acid salt thereof, with phosgene to convert said amine residue to a carbamoyl chloride isocyanate of the formula:

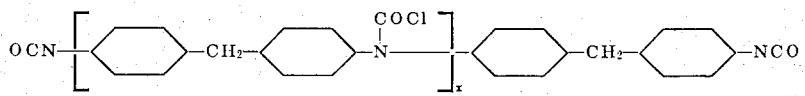

wherein x is as above defined;

B. pyrolyzing said carbamoyl chloride isocyanate by heating at elevated temperature under reduced pressure and C. recovering 4,4'-methylenebis(cyclohexylisocyanate) therefrom.

2. A process as claimed in claim 1 wherein said amine residue is present as a crude mixture with 4,4'-methylenebis(cyclohexylamine).

3. A process as claimed in claim 2 wherein said crude mixture containing said amine residue is obtained from the catalytic hydrogenation of methylenebis(phenylamine).

4. A process as claimed in claim 1 wherein step (B) is conducted at a pressure below 30 millimeters of mercury.

5. A process as claimed in claim 1 wherein step (B) is conducted at a pressure between about 0.2 and 20 millimeters of mercury and at a temperature between about 170° and 280° C.

6. A process as claimed in claim 1 wherein said amine residue is in the form of a mineral acid salt.

7. A process as claimed in claim 6 wherein said acid salt is the hydrochloride of said amine residue.

8. A process for the preparation of 4,4'-methylenebis(cyclohexylisocyanate) which comprises A. reacting a crude mixture of the hydrochloride salt of 4,4'-methylenebis(cyclohexylamine) containing at least 5 percent by weight of the hydrochloride salt of a secondary amine polyamine residue of the formula:

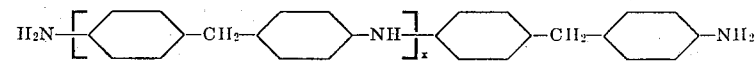

wherein x is an integer of from 1 to 3 with phosgene to form a carbamoyl chloride isocyanate of the formula:

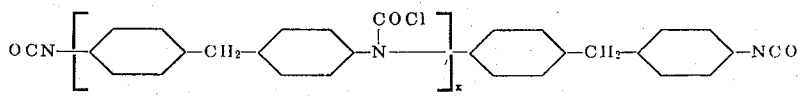

wherein x is as above defined;

B. heating said phosgenation mass to a temperature between about 170° and 280° C. under a pressure between about 0.2 and 20 millimeters of mercury to distill 4,4'-methylenebis(cyclohexylisocyanate) and pyrolyze said carbamoyl chloride isocyanate and C. recovering 4,4'-methylenebis(cyclohexylisocyanate) thus formed.

* * * * *

UNITED STATES PATENT OFFICE
CERTIFICATE OF CORRECTION

Patent No. 3,859,323                Dated Jan. 7, 1975

Inventor(s) Maurice E. Bailey, et al

It is certified that error appears in the above-identified patent and that said Letters Patent are hereby corrected as shown below:

The term of this patent subsequent to September 7, 1989, has been disclaimed.

Signed and Sealed this

Seventeenth Day of August 1976

[SEAL]

Attest:

RUTH C. MASON
Attesting Officer

C. MARSHALL DANN
Commissioner of Patents and Trademarks